US010764442B1

(12) United States Patent
Delaney et al.

(10) Patent No.: US 10,764,442 B1
(45) Date of Patent: Sep. 1, 2020

(54) MUTING AN AUDIO DEVICE PARTICIPATING IN A CONFERENCE CALL

(71) Applicant: LENOVO (Singapore) PTE. LTD., New Tech Park (SG)

(72) Inventors: Mark Patrick Delaney, Raleigh, NC (US); Nathan J. Peterson, Oxford, NC (US); Russell Speight VanBlon, Raleigh, NC (US); John Carl Mese, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/367,157

(22) Filed: Mar. 27, 2019

(51) Int. Cl.
*H04M 3/42* (2006.01)
*H04M 3/56* (2006.01)

(52) U.S. Cl.
CPC ........ *H04M 3/568* (2013.01); *H04M 2242/30* (2013.01)

(58) Field of Classification Search
CPC .................... H04M 3/568; H04M 2242/30
USPC .............................. 379/202.01, 158
See application file for complete search history.

(56) References Cited

U.S. PATENT DOCUMENTS

| 5,675,374 | A | * | 10/1997 | Kohda | H04N 7/15 |
| | | | | | 348/14.1 |
| 6,810,116 | B1 | * | 10/2004 | Sorensen | H04M 3/56 |
| | | | | | 379/202.01 |
| 2009/0051756 | A1 | * | 2/2009 | Trachtenberg | H04N 7/142 |
| | | | | | 348/14.08 |
| 2011/0231407 | A1 | * | 9/2011 | Gupta | G06Q 10/10 |
| | | | | | 707/748 |
| 2015/0089394 | A1 | * | 3/2015 | Chen | H04N 7/142 |
| | | | | | 715/753 |
| 2017/0093592 | A1 | * | 3/2017 | Zhang | H04L 12/2809 |
| 2018/0007122 | A1 | * | 1/2018 | Levin | H04L 45/122 |
| 2018/0124128 | A1 | * | 5/2018 | Faulkner | H04L 67/18 |
| 2018/0278682 | A1 | * | 9/2018 | Vendrow | H04L 67/104 |
| 2019/0020853 | A1 | * | 1/2019 | Segal | H04N 5/44513 |
| 2019/0394425 | A1 | * | 12/2019 | Segal | H04N 21/4316 |

* cited by examiner

*Primary Examiner* — William J Deane, Jr.
(74) *Attorney, Agent, or Firm* — Kunzler Bean & Adamson

(57) ABSTRACT

For muting an audio device participating in a conference call, methods, apparatus, and systems are disclosed. One apparatus includes a processor and a memory that stores code executable by the processor. The processor identifies a plurality of physical locations participating in a conference call and identifies a plurality of devices participating in the conference call, wherein each device is located in one of the plurality of physical locations. The processor designates a primary device for each physical location, the primary device being a highest priority device at that physical location and mutes an audio device of each of the plurality of devices that is not designated a primary device.

20 Claims, 6 Drawing Sheets

| Participant ID | Mic? | Speaker? | Multi-user? | Meeting Leader? | Location ID | Same room as others? |
|---|---|---|---|---|---|---|
| User A Laptop | Y | Y | N | Y | Location #1 | Y |
| Conference Hub 500 | Y | Y | Y | N | Location #1 | Y |
| User B Laptop | Y | Y | N | N | Location #1 | Y |
| User C Laptop | Y | N | N | N | Location #1 | Y |
| User D Cell Phone | Y | Y | N | N | Location #2 | N |

500

505

We detect you are in Room 4SE-3 with Conference Hub 500. Your mic and speaker have been muted to prevent audio feedback.

Was this correct? Yes // No

FIG. 5

| Participant ID | Mic? | Speaker? | Multi-user? | Meeting Leader? | Location ID | Same room as others? |
|---|---|---|---|---|---|---|
| User A Laptop | Y | Y | N | Y | Location #1 | Y |
| User B Laptop | Y | Y | N | N | Location #1 | Y |
| User C Laptop | Y | N | N | N | Location #2 | Y |
| User D Cell Phone | Y | Y | N | N | Location #2 | Y |

FIG. 6

MUTING AN AUDIO DEVICE PARTICIPATING IN A CONFERENCE CALL

FIELD

The subject matter disclosed herein relates to electronic communications and more particularly relates to muting an audio device participating in a conference call.

BACKGROUND

In today's conference calls, multiple audio and microphone sources are used—multiple computers, phone lines, etc. These sources are not always remote from each other. When they are co-located, a common pain point is feedback and echoing. This results in poor user experience and loss of productivity.

BRIEF SUMMARY

An apparatus for managing a conference call is disclosed. A method and computer program product also perform the functions of the apparatus.

One apparatus for managing a conference call includes a processor and a memory that stores code executable by the processor. The processor identifies a plurality of physical locations participating in a conference call and identifies a plurality of devices participating in the conference call, wherein each device is located in one of the plurality of physical locations. The processor designates a primary device for each physical location, the primary device being a highest priority device at that physical location and mutes an audio device of each of the plurality of devices that is not designated a primary device.

One method for using image data to adjust a microphone setting includes identifying, by use of a processor, a plurality of physical locations participating in a conference call and identifying a plurality of devices participating in the conference call, wherein each device is located in one of the plurality of physical locations. The method includes designating a primary device for each physical location, the primary device being a highest priority device at that physical location and muting an audio device of each of the plurality of devices that is not designated a primary device.

One program product includes a computer readable storage medium that stores code executable by a processor, the executable code comprising code to identify a plurality of physical locations participating in a conference call, identify a plurality of devices participating in the conference call, wherein each device is located in one of the plurality of physical locations, designate a primary device for each physical location, the primary device being a highest priority device at that physical location, and mute an audio device of each of the plurality of devices that is not designated a primary device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a diagram illustrating a first scenario of managing a conference call;

FIG. 6 is a diagram illustrating a second scenario of managing a conference call.

DETAILED DESCRIPTION

Figure 1:
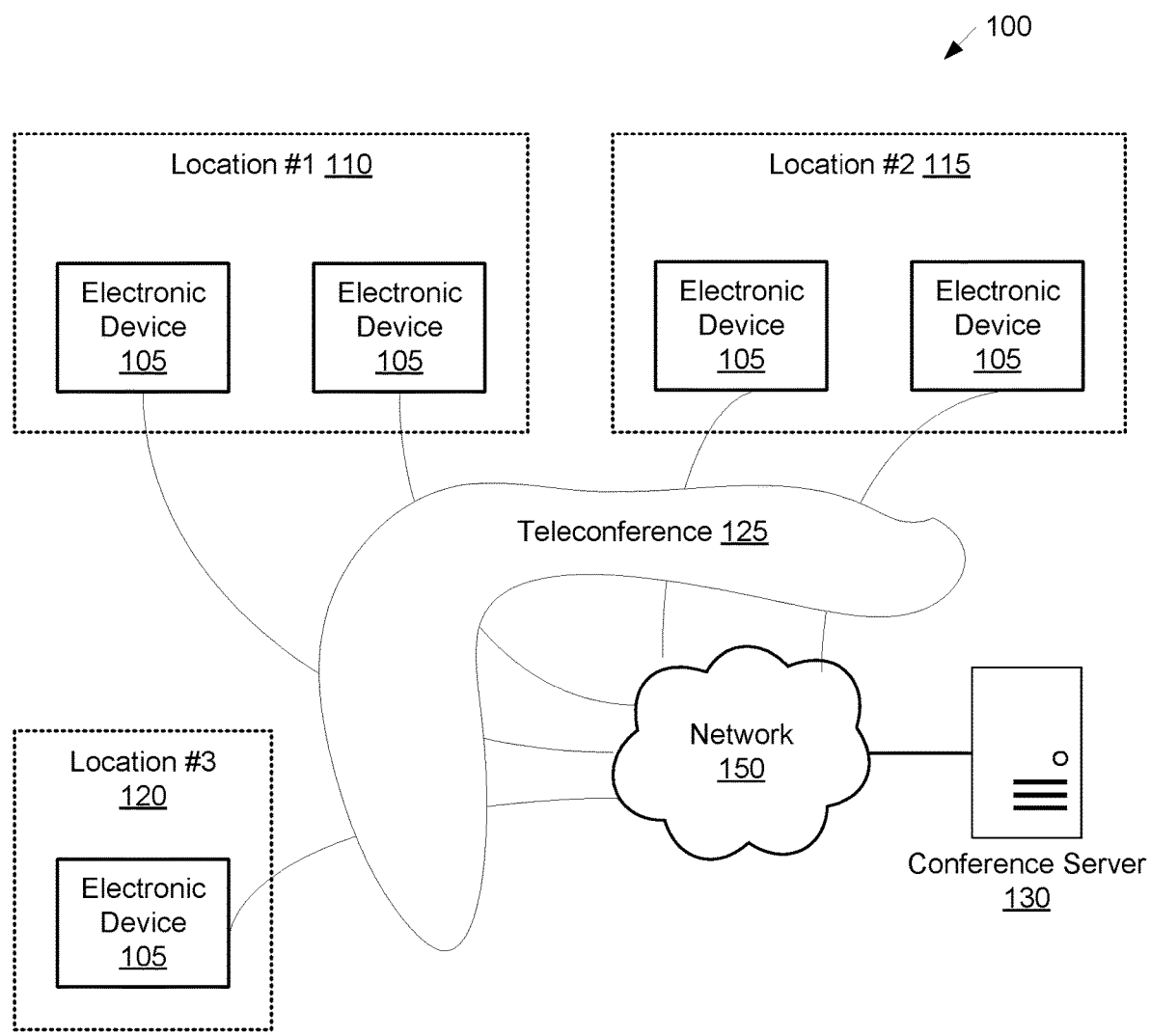
FIG. 1 is a schematic block diagram illustrating one embodiment of a system for managing a conference call.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For managing a conference call, methods, systems, and apparatuses are disclosed herein. In today's conference calls, multiple audio and microphone sources are used—multiple computers, phone lines, etc. These sources are not always remote from each other. When they are co-located, a common pain point is feedback and echoing. This results in poor user experience and loss of productivity.

The techniques disclosed herein proactively detect conference call feedback and prevent audio feedback. VoIP applications are common tools used across the enterprise to facilitate conference calls, teleconferences, etc. Examples of VoIP applications include, but are not limited to, Microsoft Lync, Skype, Google Chat, Apple FaceTime, Facebook Messenger, WeChat, WhatsApp, GoToMeeting, Zoom, WebEx, and the like.

As described above when multiple speakers or multiple microphones are in the same physical room at the same time, feedback often occurs. Audio feedback is caused with 2+n speakers and one mic, or 2+n mics and one speaker. Sounds loops through these input and output features causing a painful screech.

It becomes a guessing game when feedback is incurred. Users tend to go round robin confirming that they are in fact on mute. The feedback usually ceases with an apology when the culprit is found and the mic/speaker is silenced. Users go unbeknownst that they are the ones causing the feedback for the group. This is further complicated by multiple mute points (Skype, Windows Sound/Mixer, etc.) as well as multiple sound outputs, computer speaker, TV, call in line, etc. A solution is required that proactively identifies potential audio feedback and prompts users to prevent.

Proactively detecting conference call feedback and preventing audio feedback may be implemented by a central entity, such as a conferencing server, or on individual client connection. In one embodiment, a device of the meeting leader proactively prevents audio feedback on the conference call by muting an audio device participating in a conference call.

In various embodiments, the devices of the conference call are on the same network. In some embodiments, devices of the conference call located in the same room are able to communicate with one another via local wireless network, such as BLUETOOTH, WIFI, mesh networks, or the like.

In order to remove echoing, the system categorizes devices into a logic based hierarchy for mic and speaker options relative to the users involved with the meeting or conference call. Moreover, a primary device is designated for each location, and an audio device is muted for each of the participating devices that is not designated a primary device. In one embodiment, a microphone device is automatically muted in non-primary devices to proactively prevent audio feedback. In another embodiment, a speaker device is automatically muted in non-primary devices to proactively prevent audio feedback. In other embodiments, both a microphone device and a speaker device are muted in non-primary devices to proactively prevent audio feedback.

Disclosed herein is an apparatus for managing a conference call, according to embodiments of the disclosure. The apparatus includes a processor and a memory that stores code executable by the processor. The processor identifies a plurality of physical locations participating in a conference call and identifies a plurality of devices participating in the conference call, wherein each device is located in one of the plurality of physical locations. The processor designates a primary device for each physical location, the primary device being a highest priority device at that physical location and mutes an audio device of each of the plurality of devices that is not designated a primary device.

In certain embodiments, muting an audio device comprises muting a microphone and/or muting a speaker. In some embodiments, the processor queries the plurality of devices participating in the conference call for location information and associates each device with one of the plurality of physical locations. In certain embodiments, identifying the plurality of devices comprises searching for a device on a same network and determining whether the device on the same network as a participant of the conference call.

In various embodiments, the processor prioritizes the plurality of devices, each location including at least one of the plurality of devices. In certain embodiments, prioritizing the plurality of devices comprises identifying a device type selected from a personal device and a multi-user device, wherein a multi-user device is given higher priority than a personal device. In certain embodiments, prioritizing the plurality of devices comprises identifying a meeting leader, wherein a personal device of the meeting leader is given higher priority than a personal device of a participant that is not the meeting leader. In some embodiments, the processor determines device capabilities for each of the plurality of devices participating in the conference call. In such embodiments, prioritizing the plurality of devices is based on the device capabilities.

Disclosed herein is a method for using image data to adjust a microphone setting. In various embodiments, the method includes identifying, by use of a processor, a plurality of physical locations participating in a conference call and identifying a plurality of devices participating in the conference call, wherein each device is located in one of the plurality of physical locations. The method includes designating a primary device for each physical location, the primary device being a highest priority device at that physical location and muting an audio device of each of the plurality of devices that is not designated a primary device.

In certain embodiments, muting an audio device comprises muting a microphone and muting a speaker. In some embodiments, the method further includes querying the plurality of devices participating in the conference call for location information and associating each device with one of the plurality of physical locations. In certain embodiments, identifying the plurality of devices comprises searching for a device on a same network and determining whether the device on the same network as a participant of the conference call.

In various embodiments, the method includes prioritizing the plurality of devices, each location including at least one of the plurality of devices. In certain embodiments, prioritizing the plurality of devices comprises identifying a device type selected from a personal device and a multi-user device, wherein a multi-user device is given higher priority than a personal device. In certain embodiments, prioritizing the plurality of devices comprises identifying a meeting leader, wherein a personal device of the meeting leader is given higher priority than a personal device of a participant that is not the meeting leader. In some embodiments, the method further includes determining device capabilities for each of the plurality of devices participating in the conference call, wherein prioritizing the plurality of devices is based on the device capabilities.

Disclosed herein is a program product for managing a conference call. In various embodiments, the program product includes a computer readable storage medium that is not a transitory signal and that stores code executable by a processor. Here, the executable code including code to identify a plurality of physical locations participating in a conference call, to identify a plurality of devices participating in the conference call, wherein each device is located in one of the plurality of physical locations, to designate a primary device for each physical location, the primary device being a highest priority device at that physical location, and to mute an audio device of each of the plurality of devices that is not designated a primary device.

In certain embodiments, muting an audio device comprises muting a microphone and muting a speaker. In some embodiments, the program product includes code to query the plurality of devices participating in the conference call for location information and to associate each device with one of the plurality of physical locations. In certain embodiments, identifying the plurality of devices comprises searching for a device on a same network and determining whether the device on the same network as a participant of the conference call.

In various embodiments, the program product includes code to prioritize the plurality of devices, each location including at least one of the plurality of devices. In certain embodiments, prioritizing the plurality of devices comprises identifying a device type selected from a personal device and a multi-user device, wherein a multi-user device is given higher priority than a personal device. In certain embodiments, prioritizing the plurality of devices comprises identifying a meeting leader, wherein a personal device of the meeting leader is given higher priority than a personal device of a participant that is not the meeting leader. In some embodiments, the program product includes code to determine device capabilities for each of the plurality of devices participating in the conference call, wherein prioritizing the plurality of devices is based on the device capabilities.

FIG. 1 depicts a system 100 for managing a conference call, according to embodiments of the disclosure. The system 100 includes a plurality of electronic devices 105 and a plurality of locations, here a first location 110, a second location 115, and a third location 120. Here, the electronic devices 105 participate in a teleconference 125, such as a videoconference or conference call.

The electronic device 105 may be any computing device capable of managing a conference call. In some embodiments, the electronic device 105 may be a computing device, including, but not limited to, a telephone, a speakerphone, a conference phone, a mobile phone, a smart phone, a tablet computer, a laptop computer, a netbook, a handheld computer, a wearable computer, a desktop computer, an all-in-one computer, a server, a teleconferencing hub, a room system console, a gaming console, or the like. In one embodiment, the electronic device 105 is a portable (e.g., mobile) device. In another embodiment, the electronic device 105 is a stationary device.

As depicted, there is at least one electronic device 105 located at each location 110-120 participating in the teleconference 125. While not depicted, there may be one or more other electronic devices at the locations 110-120 that do not participate in the teleconference 125. Accordingly, there are three physical locations (locations 110-120) associated with the teleconference 125. In one embodiment, the teleconference 125 is supported by the conferencing server 130.

In various embodiments, at least one electronic device 105 involved in the teleconference 125 identifies a plurality of physical locations participating in a conference call and identifies the devices participating in the conference call. As depicted, each device 105 is located in one of the plurality of physical locations. The at least one electronic device 105 designates a primary device for each physical location, the primary device being a highest priority device at that physical location and mutes an audio device of each of the plurality of devices that is not designated a primary device.

In certain embodiments, one of the electronic devices 105 is the leader of the teleconference 125. Here, the leader device may identify locations and participant device and proactively prevent audio feedback. In another embodiment, each participant device performs the above procedures to identify locations and participant device and proactively prevent audio feedback. Note that the individual participant devices may mute themselves in response to determining that they are not the primary device at that location. In other embodiments, the conferencing server 130 identifies the locations and participant device and proactively prevents audio feedback by muting (alternatively, by sending mute commands) the non-primary participant devices in the teleconference 125.

In certain embodiments, the system 100 also includes a network 150, wherein the electronic devices 105 and conferencing server 130 communicate one with another via the network 150. The network 150 may include one or more data networks, including, but not limited to, telephone networks, local area networks, wireless networks, the Internet, and the like.

In one embodiment, the first location 110 corresponds to a conference room at a first geographical location. Here, one of the electronic devices 105 in the conference room may be a multi-user conferencing device, such as conference hub or room system console. In the depicted example, multiple electronic devices 105 are present in the first location 110.

As used herein, a 'multi-user conferencing device' refers to a electronic device 105 optimized for simultaneous use by multiple teleconference participants. In general, a multi-user device has better microphone and speaker capabilities than a 'personal device.' Examples of multi-user devices include, but are not limited to, a speakerphone, a conference phone, a teleconferencing hub, and a room system console. In contrast, a 'personal device' refers to a conferencing device not optimized for use by multiple users simultaneously. Examples of personal devices include, but are not limited to a telephone, a mobile phone, a smart phone, a tablet computer, a laptop computer, a handheld computer, and a wearable computer.

In one embodiment, the second location 115 corresponds to a second geographical location. Here, the second location 115 may be an office or conference room at another site. A multi-user conferencing device may or may not be present at the second location 115.

In one embodiment, the third location 120 corresponds to a site with a single participating electronic device 105. Here, the third location may be an office, home, or other location where the electronic device 105 is present. In the depicted example, one electronic device 105 at each of the locations 110-120 is selected to be the primary device at that location. All other electronic devices 105 at these locations may be automatically muted to proactively prevent audio feedback.

The primary devices may be the highest priority electronic device 105, as discussed in further detail below.

Figure 2:
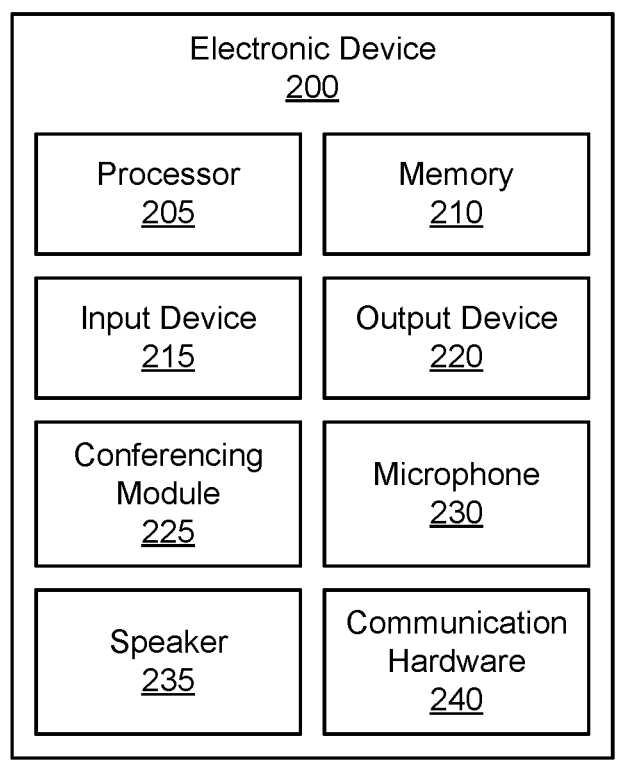
FIG. 2 is a schematic block diagram illustrating one embodiment of an apparatus for managing a conference call.

FIG. 2 depicts an electronic device 200 for managing a conference call (e.g. teleconference), according to embodiments of the disclosure. The electronic device 200, may be one implementation of the electronic device 105. Alternatively, the electronic device 200 may be an implementation of the conferencing server 130.

The electronic device 200 may include a processor 205, a memory 210, an input device 215, an output device 220, a conferencing module 225, a microphone unit 230, a speaker unit 235, and communication interface 240. In certain embodiments, the electronic device 200 contains the processor 205, the memory 210, the conferencing module 225, the microphone unit 230, and the speaker unit 235, but does not include one or more of: the input device 215, the output device 220, and/or the communication interface 240.

The electronic device 200 may include a body or an enclosure, with the components of the electronic device 200 being located within the enclosure. In various embodiments, the electronic device 200 includes a battery or power supply for providing electrical power to the electronic device 200. Moreover, the components of the electronic device 200 are communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the output device 220, the conferencing module 225, the microphone unit 230, the speaker unit 235, and the communication interface 240.

The memory 210, in one embodiment, is a computer readable storage medium. In some embodiments, the memory 210 includes volatile computer storage media. For example, the memory 210 may include a random-access memory ("RAM"), including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to managing a conference call. For example, the memory 210 may store physical locations associated with the conference call, devices participating in the conference call, statuses and capabilities of the participating devices, and the like. In some embodiments, the memory 210 also stores program code and related data, such as an operating system operating on the electronic device 200. In one embodiment, the memory 210 stores program code for a conferencing client used to participate in the conference call.

The input device 215, in one embodiment, may comprise any known computer input device including a touch panel, a button, a keypad, and the like. In certain embodiments, the input device 215 includes a camera for capturing image data. In some embodiments, a user may input instructions via the camera using visual gestures. In some embodiments, the input device 215 (or portion thereof) may be integrated with the output device 220, for example, as a touchscreen or similar touch-sensitive display. In some embodiments, the input device 215 comprises two or more different devices, such as a camera and a touch panel.

The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In certain embodiments, the output device 220 includes one or more speakers for producing sound, such as an audible alert or notification. In some embodiments, the output device 220 includes one or more haptic devices for producing vibrations, motion, or other haptic output.

In some embodiments, all or portions of the output device 220 may be integrated with the input device 215. For example, the input device 215 and output device 220 may form a touchscreen or similar touch-sensitive display. As another example, the input device 215 and output device 220 may form a display that includes haptic response mechanisms. In other embodiments, the output device 220 may be located near the input device 215. For example, the microphone unit 230, speaker unit 235, a camera, and touchscreen may all be located on a common surface of the electronic device 200. The output device 220 may receive instructions and/or data for output from the processor 205 and/or the conferencing module 225.

The conferencing module 225, in one embodiment, is configured to identify a plurality of physical locations participating in a conference call and identify a plurality of devices participating in the conference call. In one embodiment, the conferencing module 225 may be embodied in a software application (or set of software applications) stored in the memory 210 and operating on the electronic device 200 (e.g., running on the processor 205).

As noted above, each device may be located in one of the plurality of physical locations. In some embodiments, the conferencing module 225 orders the devices participating in the conference call according to priority. In some implementations, prioritizing the plurality of devices may include identifying a device type selected from a personal device and a multi-user device. In some implementations, a multi-user device may be given higher priority than a personal device. In further implementations, a dedicated conferencing device, such as a teleconferencing hub or a room system console, may be given highest priority as between device types.

In some implementations, prioritizing the plurality of devices may include identifying a meeting leader and/or a presenter. Note that leader and/or presenter status may be used as a tie-breaker to determine priority rankings among devices of the same type (e.g., personal devices). In certain implementations, a personal device of the meeting leader may be given higher priority than a personal device of a participant that is not the meeting leader. In certain implementations, a personal device of the presenter may be given higher priority than a personal device of a participant that is not the presenter. Where the meeting leader is not the presenter, a personal device of the presenter may be given higher priority than a personal device of the meeting leader.

The conferencing module 225 appoints a primary device for each physical location. Here, the primary is the highest priority device at that physical location. The conferencing module 225 automatically mutes an audio device of each of the plurality of devices that is not designated a primary device. Here, automatically muting the non-primary devices may occur upon initializing the conference call.

As used herein, "muting" a non-primary device may include sending an instruction to mute a microphone and/or speaker of the non-primary device. In certain embodiments, the muting is implemented at the conferencing client level. In other embodiments, the muting may be implemented at the device level or another suitable level.

In certain embodiments, the conferencing module 225 reassesses the device priority ranking during the conference call and may select a new primary device at one or more conferencing locations. Accordingly, the conferencing module 225 may mute or unmute one or more devices participating in the conference after initially muting all non-primary devices.

Further, the conferencing module 225 may permit conferencing participants to override the initial muting. However, in some embodiments, the conferencing module 225 automatically reasserts the muting of non-primary devices in response to detecting audio feedback during the conference call.

In one embodiment, the conferencing module 225 reassesses which devices are to be muted in response to a new participant joining the conference call. If the new participant is at a new location, then it becomes the primary device for the new location. Otherwise, if the new device ranks higher than the current primary device at an existing location, then the new device becomes the new primary device at that location and the old primary device may be muted. Otherwise, if the new device is not the highest priority device at its location, then the conferencing module 225 automatically mutes the new device.

Similarly, the conferencing module 225 may reassess which devices are to be muted in response to a participant leaving the conference call. For example, if the primary device leaves the conference call, then the highest priority of the devices remaining at that location will be designated the new primary device and automatically unmuted.

In certain embodiments, the conferencing module 225 reassesses which devices are to be muted in response to a change is the meeting presenter. As discussed above, presenter status may be considered when determining the priority ranking of the participating devices. Thus, when the meeting presenter changes, this may affect the priority rankings leading to the selections of a new primary device. Similarly, other status changes of the participants and/or their devices may lead to a change in which device is the primary device.

The microphone unit 230, in one embodiment, comprises at least one input sensor (e.g., microphone transducer) that converts acoustic signals (sound waves) into electrical signals, thereby receiving audio signals. In various embodiments, the user inputs sound or voice data (e.g., voice commands) via the microphone array. Here, the microphone unit 230 picks up sounds (e.g., speech) from one or more teleconference participants. As described above, the conferencing module 225 may control the microphone unit 230 to automatically mute incoming audio at the electronic device 200

The speaker unit 235, in one embodiment, is configured to output acoustic signals. Here, the speaker unit 235 produces audio output, for example of conversation or other audio content of a teleconference.

The communication interface 240 may include hardware circuits and/or software (e.g., drivers, modem, protocol/ network stacks) to support wired or wireless communication between the electronic device 200 and another device or network, such as the network 150. Here, the communication interface 240 is used to connect the electronic device 200 to the conference call. A wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Note that the conferencing module 225 may use the communication interface 240 to identify nearby devices that are participants in the conference call (e.g., present at the same location). In various embodiments, the conferencing module 225 may use the communication interface to query devices participating in the call for locations, capabilities, and other information for determining the priority rankings of the participating devices.

Figure 3:
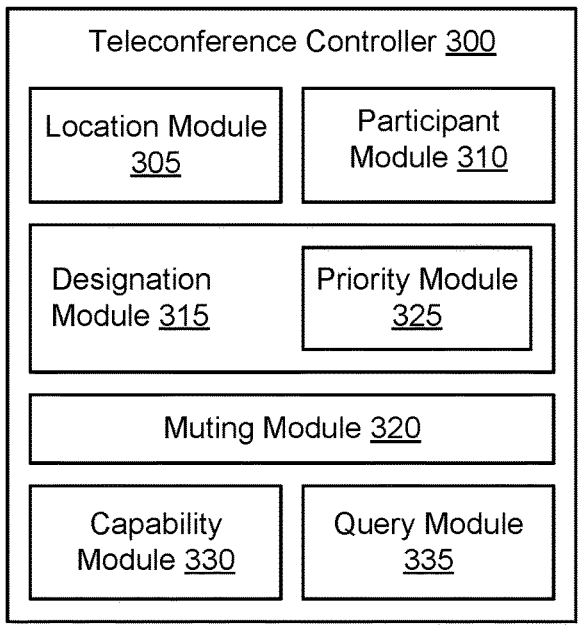
FIG. 3 is a schematic block diagram illustrating one embodiment of a teleconference controller for managing a conference call.

FIG. 3 depicts a teleconference controller 300 for managing a conference call, according to embodiments of the disclosure. The teleconference controller 300 may be one embodiment of the conferencing module 225, discussed above. Further, the teleconference controller 300 may be implemented on an electronic device, such as the electronic device 105 and/or electronic device 200. In one embodiment, the controller 300 may be implemented as a hardware circuit comprising custom VLSI circuits or gate arrays, off-the-shelf semiconductors such as logic chips, transistors, or other discrete components. The controller 300 may also be implemented in programmable hardware devices such as field programmable gate arrays, programmable array logic, programmable logic devices or the like.

As depicted, the teleconference controller 300 includes a plurality of modules. Specifically, the teleconference controller 300 may include a location module 305, a participant module 310, a designation module 315 and a muting module 320. In certain embodiments, the teleconference controller 300 may also include one or more of: a priority module 325, a capability module 330, and a query module 335. The modules 305-335 may be implemented as hardware, software, or a combination of hardware and software.

The location module 305, in one embodiment, is configured to identify a plurality of physical locations participating in a conference call. Identifying the plurality of devices may include searching for a device on a same network and determining whether the device on the same network as a participant of the conference call. In various embodiments, the location module 305 works in conjunction with the query module 335 to identify the physical locations participating in a conference call.

As used herein, a physical location refers to a room, or similar, at a location. Each physical location participating in the conference call includes at least one participating device. In certain embodiments, several rooms in the same building participate in the conference call. In other embodiments, the rooms participating in the conference call are located in different buildings.

Note that the location module 305 may not need to know an absolute location (e.g., global coordinates) of the physical locations participating in the conference call. Rather, the location module 305 needs to determine a number of unique locations participating in the conference call. Thus, while global coordinates, street addresses, etc. may be useful in determining which participants are in which location, it may be sufficient for the location module 305 to assign the physical locations an identifier in order to determine the number of locations participating in the conference call and identify which participants are in which location.

In some embodiments, physical locations may be identified using network locations (e.g., network addresses), wireless networks in range, wireless beacons (e.g., radio, optical, infrared, ultrasonic) in range, and the like. In certain embodiments, the physical locations may be registered by the meeting leader and/or indicated by the participants.

The participant module 310, in one embodiment, is configured to identify a plurality of devices participating in the conference call. Here, each participating device is located in one of the physical locations participating in a conference call. In various embodiments, each participating device establishes a connection to a conferencing service in order to participate in the conference call. In certain embodiments, the participating devices include a conferencing client used to access the conferencing service.

In various embodiments, the participant module 310 determines a number of participants at each physical location participating in the conference call. Moreover, the participant module 310 may determine which participants are in which location. As noted above, location information for each participant may be used to determine which participants are in which location.

The designation module 315, in one embodiment, is configured to appoint one device at each physical location to be the primary device for that location. Here, the primary device may be a highest priority device at that physical location. In various embodiments, the designation module 315 includes a priority module 325 for determining a priority ranking of each device participating in the conference call.

Note that the designation of a primary device may be dynamic and change according to the conference call participants, their roles, and their devices' capabilities. For example, as higher priority devices join the conference call, the role of primary device may change at a physical location. Similarly, if a high priority device leaves the conference call, this too may change which device is the primary device.

The muting module 320, in one embodiment, is configured to mute an audio device of each of the plurality of devices that is not designated a primary device. In certain embodiments, the muting module 320 mutes the microphone of a non-primary device. In certain embodiments, the muting module 320 mutes the speaker(s) of a non-primary device. Note that if an audio device, such as a microphone or speakers, is unlikely to cause audio feedback, then the muting module 320 may decide not to automatically mute that device. For example, a directional microphone may not contribute to audio feedback due to its directionality being pointed away from a speaker. As another example, a small speaker device, such as headphones may not contribute to audio feedback due to their low audio output.

The priority module 325, in one embodiment, is configured to give a priority ranking to the plurality of devices participating in the conference call. The priority ranking may determine on a number of factors including a device type, device capabilities, device role, etc. In various embodiments, the priority module 325 coordinates with the capability module 330 and/or the query module 335 to identify the device type, device capabilities, device role, etc. for the plurality of devices participating in the conference call.

The capability module 330, in one embodiment, is configured to determine device capabilities for each of the plurality of devices participating in the conference call. Here, the device capabilities may include whether the participating device has a microphone, whether the participating device has a speaker, whether the participating device is a multi-user device (e.g., a conferencing hub or room system console), and the like. As noted above, the priority ranking of the plurality of devices may be based on the device capabilities.

The query module 335, in one embodiment, is configured to query the plurality of devices participating in the conference call for location information. Here, the participant module 310 may use the responses to associate each device with one of the plurality of physical locations. Additionally, the query module 335 may query the plurality of devices for their role in the conference call (e.g., leader, presenter, etc.), their device capabilities, or the like.

Figure 4:
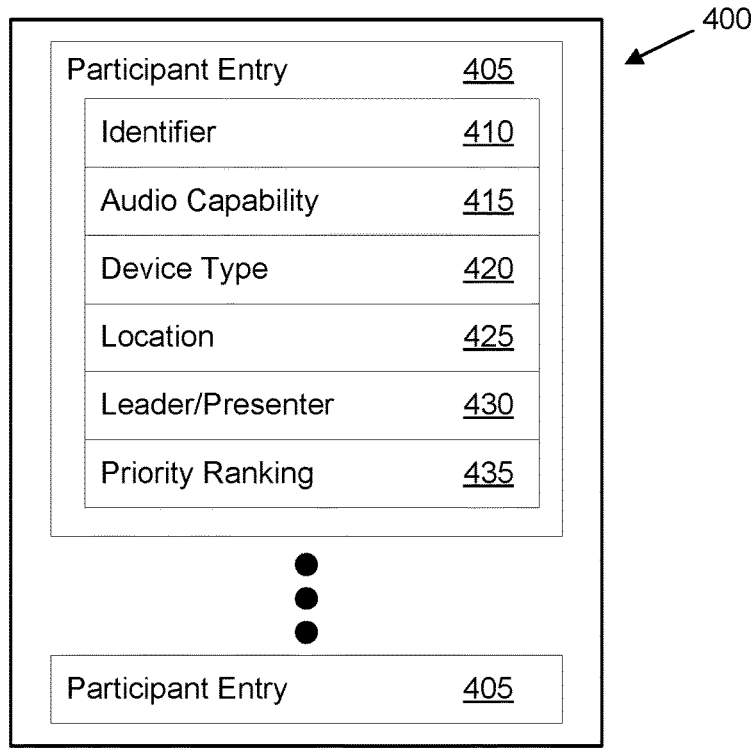
FIG. 4 is a block diagram in the street in one embodiment of a data structure used for managing a conference call.

FIG. 4 depicts a data structure 400 for managing a conference call, according to embodiments of the disclosure. In various embodiments, the data structure 400 may be created by an electronic device, such as the electronic device 105, the conferencing server 130, the electronic device 200, the conferencing module 225, and/or by the teleconference controller 300. As depicted, the data structure 400 includes various participant entries 405, which (e.g., collectively) indicate states of the participants in a conference call or other teleconference.

The participant entries 405 contain various values related to the state of each participant in the conference call. In the depicted embodiment, a participant entry 405 may include an identifier 410, an audio capability 415, a device type 420, a location 425, and a leader or presenter status 430. In some embodiments, the participant entries 405 are listed in order of priority, for example with participants having higher priority being listed before those of lower priority. In some embodiments, the participant entry 405 may include a priority ranking 435.

In various embodiments, the identifier 410 stores the identity of the participant and/or the participating device. For example, the identifier may store a user name, a machine name, a telephone number, or other suitable identifier.

In various embodiments, the audio capability 415 identifies whether the participating device has a microphone capability and whether the participating device has a speaker capability. In certain embodiments, the audio capability 415 may also indicate qualities of the microphone or speaker capabilities (e.g., directional, high fidelity, etc.).

In various embodiments, the device type 420 indicates whether the participating device is a multi-user device or a personal device. In some embodiments, the device type 420 specifies a type of multi-user device (e.g., conference hub, speaker phone, room system console, etc.) or a type of personal device (e.g., mobile phone, laptop, etc.).

In various embodiments, the location 425 indicates in which of the physical locations the participant is located. In one embodiment, the location 425 includes a room, such as "Conference Room 301" or "Office 503". In another embodiment, the location 425 is a label, such as "Location #1", "Room A". Further, by analyzing the location 425 it can be determined whether the participant is in the same room as other participants.

In various embodiments, the leader/presenter status 430 indicates whether the participating device is a meeting leader or a meeting presenter. Note that the role of meeting presenter may change during the conference call.

In various embodiments, the priority ranking 435 indicates the priority of the participant, e.g., as compared to other participants in the conference call. In one embodiment, the priority ranking 435 is specific to the location of the participant. In another embodiment, the priority ranking is general to the conference call.

FIG. 5 depicts a participant table 500 according to a first scenario for managing a conference call. In the first scenario, the table 500 indicates participant devices, device capabilities, and participant locations for the conference call. Here, the table may be compiled by the electronic device 105, conferencing server 130, the electronic device 200, the conferencing module 225, and/or the teleconference controller 300, described above.

In the depicted example, there are five participants in the conference call: User A laptop, the conference hub, User B laptop, User C laptop, and User D cell phone. All participating devices have microphone capability and all but User C laptop have speaker capability. The conference hub is a multi-user device and User A laptop is the meeting leader. As depicted, User D cell phone is at location #2 and all other participating devices are at location #1.

In one embodiment, it may be determined using BLUETOOTH or other short range wireless network protocol that User A laptop, the conference hub, User B laptop and User C laptop are in the same room, while User D cell phone is not in the same room as the others. In certain embodiments, location information or status information published by the device participants may be used to determine (or confirm) that User A laptop, the conference hub, User B laptop and User C laptop are in the same room, while User D cell phone is not in the same room as the others.

From the depicted states of participants in the conference call, it is determined that there are two locations (location #1 and location #2) participating in the call. User D cell phone is the highest priority device and thus dubbed the primary device in location #2. The microphone and speaker of User D cell phone are not muted, as the conferencing system expresses confidence that there will be no interference or audio feedback by keeping these audio devices active.

Further, the conference hub may be dubbed the primary device relative to other participating devices at location #1. Accordingly, the microphone and speaker of the conference hub are not muted, while the microphones and speakers of the other devices at location #1 are muted to proactively prevent interference, echoes, and audio feedback.

In various embodiments, a system message 505 is displayed at the non-primary devices (e.g., User A laptop, User B laptop and User C laptop) in response to being muted. Here, the system message 505 informs the user that the non-primary device is being muted. In certain embodiments, the system message 505 indicates a physical location (e.g., Room 4SE-3) that was associated with the non-primary device. The system message 505 may prompt for confirmation and/or include an element for unmuting the audio devices.

FIG. 6 depicts a participant table 600 according to a second scenario for managing a conference call. In the second scenario, the table 600 indicates participant devices, device capabilities, and participant locations for the conference call. Here, the table may be compiled by the electronic device 105, conferencing server 130, the electronic device 200, the conferencing module 225, and/or the teleconference controller 300, described above.

In the depicted example, there are four participants in the conference call: User A laptop, User B laptop, User C laptop, and User D cell phone. All participating devices have microphone capability and all but User C laptop have speaker capability. The conference hub is a multi-user device and User A laptop is the meeting leader. As depicted, User A laptop and User B laptop are at location #1, while User C laptop and User D cell phone are at location #2.

In one embodiment, it may be determined using BLUETOOTH or other short range wireless network protocol that User A laptop and User B laptop, while User C laptop and User D cell phone are together in a room, but not in the same room as the others. In certain embodiments, location information or status information published by the device participants may be used to determine (or confirm) that User A laptop and User B laptop, while User C laptop and User D cell phone are together in a room, but not in the same room as the others.

From the depicted states of participants in the conference call, it is determined that there are two locations (location #1 and location #2) participating in the call. In one embodiment, the system determines that User A laptop is the highest priority device in location #1 (note that User A laptop is the meeting leader) and thus dubbed the primary device relative to other participating devices at that location. Accordingly, the microphone and speaker of User A laptop are not muted, while the microphone and speakers of User B laptop are muted to proactively prevent interference, echoes, and audio feedback.

Further, the system may determine that User D cell phone is the highest priority device in location #2 (note that User D cell phone has both microphone and speaker, while User C laptop has microphone only) and thus may be dubbed the primary device relative to other participating devices at that location. Accordingly, the microphone and speaker of User D cell phone are not muted, while the microphone of User C laptop is muted to proactively prevent interference, echoes, and audio feedback.

In various embodiments, a system message may be displayed at the non-primary devices (e.g., User B laptop and User C laptop) in response to being muted. Here, the system message may prompt for confirmation and/or include an element for unmuting the audio devices.

Figure 7:
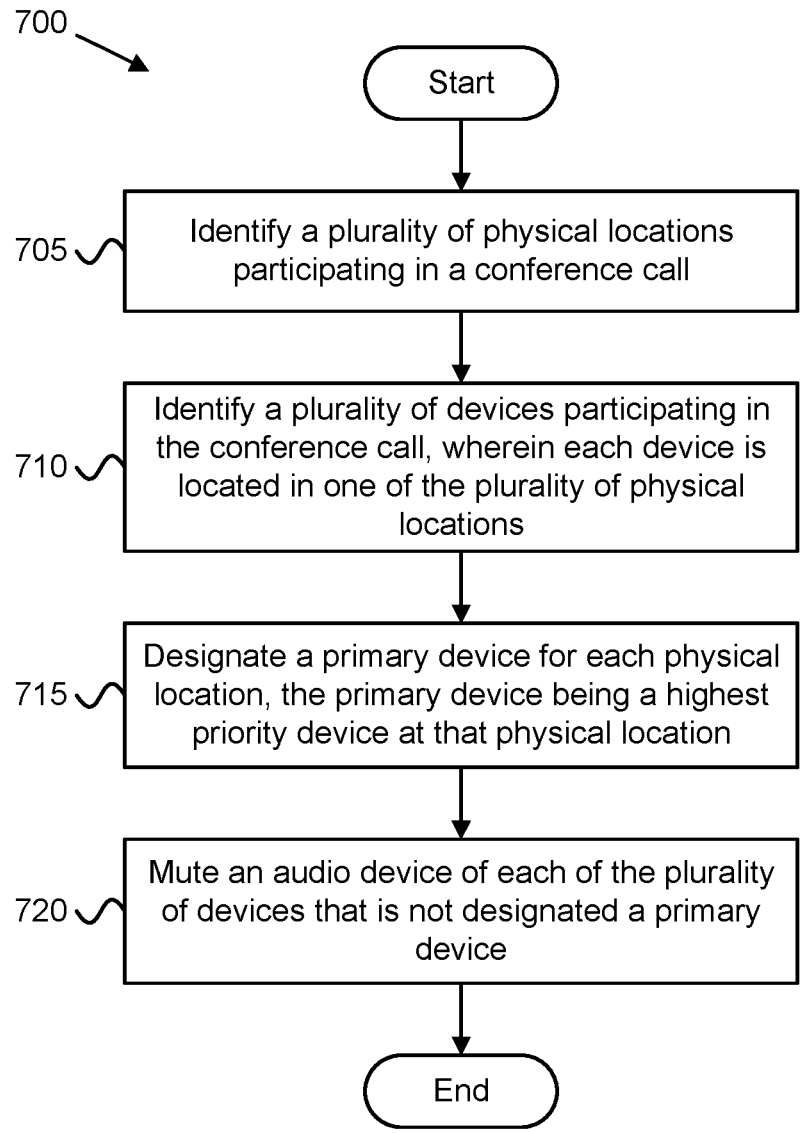
FIG. 7 is a flowchart diagram illustrating one embodiment of a method for managing a conference call.

FIG. 7 depicts a method 700 for managing a conference call, according to embodiments of the disclosure. In some embodiments, the method 700 is performed by the electronic device 105, the conferencing server 130, the electronic device 200, the conferencing module 225, and/or the teleconference controller 300, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and identifies 705 a plurality of physical locations participating in a conference call. The method 700 includes identifying 710 a plurality of devices participating in the conference call, wherein each device is located in one of the plurality of physical locations. The method 700 includes designating 715 a primary device for each physical location, the primary device being a highest priority device at that physical location. The method 700 includes muting 720 an audio device of each of the plurality of devices that is not designated a primary device. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
   identify a plurality of physical locations participating in a conference call, wherein each physical location includes at least one participant;
   identify a plurality of devices participating in the conference call, wherein each device is located in one of the plurality of physical locations, wherein at least one physical location contains at least two devices participating in the conference call;
   designate a primary device for each physical location, the primary device being a highest priority device at that physical location;
   automatically mute an audio device of each of the plurality of devices at the at least one physical location that is not designated a primary device upon initiation of the conference call;
   permit plurality of devices participating in the conference call to override the initial muting;
   detect audio feedback during the conference call; and
   automatically re-mute the muting audio device of each of the plurality of devices at the at least one physical location that is not designated a primary device in response to detecting the audio feedback.

2. The apparatus of claim 1, wherein muting an audio device comprises muting a microphone and muting a speaker.

3. The apparatus of claim 1, wherein the processor prioritizes the plurality of devices, each location including at least one of the plurality of devices.

4. The apparatus of claim 3, wherein prioritizing the plurality of devices comprises identifying a device type selected from a personal device and a multi-user device, wherein a multi-user device is given higher priority than a personal device.

5. The apparatus of claim 3, wherein prioritizing the plurality of devices comprises identifying a meeting leader, wherein a personal device of the meeting leader is given higher priority than a personal device of a participant that is not the meeting leader.

6. The apparatus of claim 3, wherein the processor determines device capabilities for each of the plurality of devices participating in the conference call, wherein prioritizing the plurality of devices is based on the device capabilities.

7. The apparatus of claim 1, wherein identifying the plurality of devices comprises searching for a device on a same network and determining whether the device on the same network as a participant of the conference call.

8. The apparatus of claim 1, wherein the processor queries the plurality of devices participating in the conference call for location information and associates each device with one of the plurality of physical locations.

9. A method comprising:
   identifying, by use of a processor, a plurality of physical locations participating in a conference call, wherein each physical location includes at least one participant;
   identifying a plurality of devices participating in the conference call, wherein each device is located in one of the plurality of physical locations, wherein at least one physical location contains at least two devices participating in the conference call;
   designating a primary device for each physical location, the primary device being a highest priority device at that physical location; and
   automatically muting an audio device of each of the plurality of devices at the at least one physical location that is not designated a primary device upon initiation of the conference call;
   permitting plurality of devices participating in the conference call to override the initial muting;
   detecting audio feedback during the conference call; and
   automatically re-muting the muting audio device of each of the plurality of devices at the at least one physical location that is not designated a primary device in response to detecting the audio feedback.

10. The method of claim 9, wherein muting an audio device comprises muting a microphone and muting a speaker.

11. The method of claim 9, further comprising prioritizing the plurality of devices, each location including at least one of the plurality of devices.

12. The method of claim 11, wherein prioritizing the plurality of devices comprises identifying a device type selected from a personal device and a multi-user device, wherein a multi-user device is given higher priority than a personal device.

13. The method of claim 11, wherein prioritizing the plurality of devices comprises identifying a meeting leader, wherein a personal device of the meeting leader is given higher priority than a personal device of a participant that is not the meeting leader.

14. The method of claim 11, further comprising determining device capabilities for each of the plurality of devices participating in the conference call, wherein prioritizing the plurality of devices is based on the device capabilities.

15. The method of claim 9, wherein identifying the plurality of devices comprises searching for a device on a same network and determining whether the device on the same network as a participant of the conference call.

16. The method of claim 9, further comprising querying the plurality of devices participating in the conference call for location information and associating each device with one of the plurality of physical locations.

17. A program product comprising a computer readable storage medium that stores code executable by a processor, the executable code comprising code to:
   identify a plurality of physical locations participating in a conference call, wherein each physical location includes at least one participant;
   identify a plurality of devices participating in the conference call, wherein each device is located in one of the plurality of physical locations, wherein at least one physical location contains at least two devices participating in the conference call;

designate a primary device for each physical location, the primary device being a highest priority device at that physical location; and automatically mute an audio device of each of the plurality of devices at the at least one physical location that is not designated a primary device upon initiation of the conference call;

permit plurality of devices participating in the conference call to override the initial muting;

detect audio feedback during the conference call; and automatically re-mute the muting audio device of each of the plurality of devices at the at least one physical location that is not designated a primary device in response to detecting the audio feedback.

18. The program product of claim 17, wherein muting an audio device comprises muting a microphone and muting a speaker.

19. The program product of claim 17, wherein designating the primary device comprises prioritizing a conferencing system over a personal device.

20. The program product of claim 17, wherein designating the primary device comprises prioritizing a personal device of the meeting leader over a personal device of a participant that is not the meeting leader.

\* \* \* \* \*